A. J. Homan,
Steam Balanced Valve.
No 54,163. Patented Apr. 24, 1866.
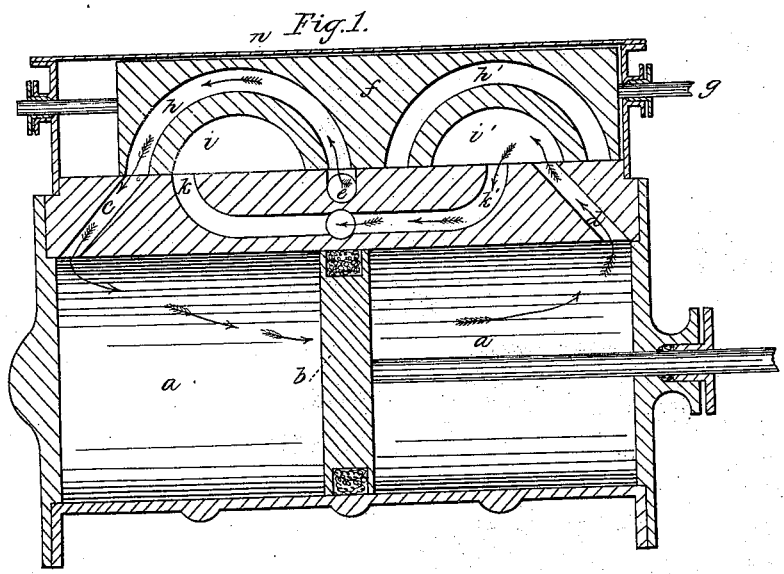
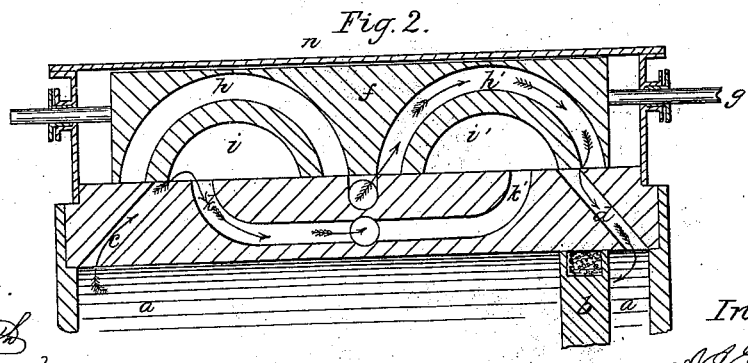
Witnesses.
Chas H Smith
Geo. D Walker
Inventor:
A. J. Homan

UNITED STATES PATENT OFFICE.

ANDREW J. HOMAN, OF YONKERS, NEW YORK.

IMPROVEMENT IN SLIDE-VALVES.

Specification forming part of Letters Patent No. 54,163, dated April 24, 1866.

*To all whom it may concern:*

Be it known that I, ANDREW J. HOMAN, of Yonkers, in the county of Westchester and State of New York, have invented and made a certain new and useful Improvement in Valves for Engines; and I do hereby declare the following to be a full, clear, and exact description of the said invention, reference being had to the annexed drawings, making part of this specification, wherein—

Figure 1 is a section of my improved valve applied to the cylinder of a steam-engine, and Fig. 2 is a similar view with the valve in a different position.

Similar marks of reference denote the same parts.

Valves for engines have heretofore been made in which the steam passes through them, entering at one side of the valve and leaving at the other; and valves have also been made in which the pressure of the steam is so balanced that there is but little friction of the valve upon its seat.

The nature of my said invention consists in a valve for engines formed with a steam-port that has its inlet and exit ends in the face of the valve, said steam-port in the valve passing over or around the exhaust-way in the valve.

By this construction the pressure of the valve upon its seat is very much lessened and friction in avoided, the power that keeps the valve to its seat being the result of the vacuum of the condenser; and I here remark that my improvement is especially adapted to condensing-engines.

In the drawings, $a$ represents the engine-cylinder; $b$, the piston; $c$ and $d$, the ports to the cylinder; $e$, the steam-supply pipe and port; $f$, the valve, moved by the rod $g$ and any desired mechanism. $h\ h'$ are the steam-ports of the valve. $i\ i'$ are the exhaust-ports of the valve, and $k\ k'$ the exhaust-ports in the valve-seat.

It will be seen that the steam passes through the ports in the direction of the black arrows into the cylinder, and the exhaust passes off as indicated by the red arrows.

The steam in the ports $h\ h'$ acts to raise the valve, because the pressure in the valve is not entirely balanced, the area of the ends of the steam-ports $h\ h'$ being the measure of the surface against which the steam acts to raise the valve off its seat, and the area of the exhaust-ports $i\ i'$ becomes the measure of the vacuum action to hold the valve to its seat; and these can be so proportioned, according to the pressure to be employed, that the valve will retain its seat, but only have sufficient pressure upon it to keep it to the seat.

After the engine is started and a vacuum produced a cover is not required for the valve; but in order to keep said valve in place and produce a steam-pressure around it until the valve is held by the vacuum a case, $n$, is employed.

What I claim, and desire to secure by Letters Patent, is—

The valve $f$, formed with the steam-ports $h$ and $h'$ above and around the exhaust-ports $i$ and $i'$, in combination with the inlet steam-port $e$ and ports $c$, $d$, $k$, and $k'$ in the valve-seat, as and for the purposes set forth.

In witness whereof I have hereunto set my signature this 1st day of February, A. D. 1866.

A. J. HOMAN.

Witnesses:
CHAS. H. SMITH,
GEO. D. WALKER.